(12) United States Patent
Clark (10) Patent No.: US 6,899,942 B2
(45) Date of Patent: *May 31, 2005

(54) OPTICAL DISK LABEL AND METHOD

(75) Inventor: Richard Lee Clark, Burlington, NC (US)

(73) Assignee: Concept Design Electronics and Manufacturing, Inc., Burlington, NC (US)

( * ) Notice: Subject to any disclaimer, the term of this patent is extended or adjusted under 35 U.S.C. 154(b) by 165 days.

This patent is subject to a terminal disclaimer.

(21) Appl. No.: 10/302,232

(22) Filed: Nov. 22, 2002

(65) Prior Publication Data

US 2003/0077414 A1 Apr. 24, 2003

Related U.S. Application Data

(63) Continuation-in-part of application No. 09/789,113, filed on Feb. 20, 2001, now Pat. No. 6,511,731.

(51) Int. Cl.$^7$ .............................. B32B 3/24; G11B 3/70
(52) U.S. Cl. ................... 428/138; 428/66.6; 428/156; 40/340; 40/638; 346/137; 360/135; 283/81; 156/242; 156/244.16; 156/244.15; 156/244.25; 264/509; 264/132; 369/282; 369/272; 369/273; 369/274; 369/283; 369/286; 369/287; 369/290; 369/289
(58) Field of Search .................... 428/66.6, 138, 428/156; 369/282, 272, 273, 274, 283, 286, 287, 290, 289; 40/340, 638; 346/137; 360/135; 156/242, 244.16, 244.15, 244.25; 264/509, 132; 283/81

(56) References Cited

U.S. PATENT DOCUMENTS

| | | | |
|---|---|---|---|
| 1,500,698 A | 7/1924 | Wiehl | |
| 1,732,747 A | 10/1929 | Germain | |
| 2,353,369 A | 7/1944 | Sears | |
| 3,970,803 A | 7/1976 | Kinzie, Jr. et al. | |
| 4,204,686 A | 5/1980 | Church | |
| 4,903,255 A | 2/1990 | Sugaya et al. | |
| 5,346,654 A | 9/1994 | Kodaka et al. | |
| 5,509,991 A | 4/1996 | Choi | |
| 5,543,001 A | 8/1996 | Casillo et al. | |
| 5,725,931 A | 3/1998 | Landin et al. | |
| 5,770,289 A | 6/1998 | Tracy | |
| 5,882,555 A | 3/1999 | Rohde et al. | |
| 6,473,391 B1 * | 10/2002 | Chen | 369/290 |
| 6,495,232 B2 * | 12/2002 | Weber | 428/64.1 |
| 6,690,642 B2 * | 2/2004 | Chen | 369/290 |

FOREIGN PATENT DOCUMENTS

JP 04185317 2/1994

OTHER PUBLICATIONS

IBM Technical Disclosure Bulletin; "Label Applicator"; pp. 2376–2377; Published Dec.,1973.
IBM Technical Disclosure Bulletin; "Diskette Labeler"; pp. 2413–2414; Published Nov., 1986.
IBM Technical Disclosure Bulletin; "Label Printing Software"; 1–page; Published May, 1985.
IBM Technical Disclosure Bulletin; "Diskette Label Printer"; pp. 4146–4148; Published Feb., 1986.
IBM Technical Disclosure Bulletin; "Rotatable Label Plate"; pp. 299–300; Published Apr., 1993.
IBM Technical Disclosure Bulletin; "Pressure Sensitive Adhesive Label Placement Apparatus"; pp. 247–250; Published Sep., 1995.

* cited by examiner

Primary Examiner—William P. Watkins, III
(74) Attorney, Agent, or Firm—Adams Evans P.A.

(57) ABSTRACT

An optical disk of the type rotated by a spindle positioned in a centrally-located hole, and including a disk body including an annular data area, and a centrally-located, integrally-formed annular web positioned radially inward from the annular data area and covering a hole formed in the disk body. The annular web is formed sufficiently thin to be deflected upwardly out of the plane of the disk body by the spindle during placement on the spindle and during rotation. The web may be broken away from the disk, or made sufficiently thin and resilient that it will deform upwardly when placed on the spindle and resume its former position when removed.

10 Claims, 11 Drawing Sheets

OPTICAL DISK LABEL AND METHOD

TECHNICAL FIELD AND BACKGROUND OF THE INVENTION

This invention relates to a label for an optical disk. Optical disks presently take many forms, and include plastic disks which contain digital data which may represent computer software, music, video, graphics and many other types of digital data. Such disks are presently made in many sizes and are referred to by different names, for example, CD's, compact disks, optical disks, DVD's, and include unrecorded disks which can be "burned" by consumers and disks which are capable of being recorded and then re-recorded. These disks are typically circular.

Optical disks are also now made and sold which have irregular shapes, and are used for many purposes including business advertising. Such disks can be formed in virtually any shape so long as they will fit into and function in a disk player. One such shape commonly made and distributed is a "business card" disk, which comprises an optical disk which has been cut down in size so that two of the opposing sides are parallel, and the other two opposing sides are convex. The principal requirement for such disks is that the data area exist as a continuous annular area symmetrically positioned around the center hole by which the optical disk is placed on the spindle of a disk player. Such disks are approximately the size of a business card, or somewhat larger.

This application relates to all types of optical disks which have a hole formed in them by which they are rotated during playback. The hole is required not only for playback of the optical disk, but during manufacture, during which large stacks of optical disks are manipulated and transported on long rods or spindles.

The existence and necessity of the hole presents a significant disadvantage in the use of optical disks as advertising and promotional products, since the hole is relatively large in relation to the overall size of the disk, particularly in the smaller format disks and those with irregular shapes. For example, with the so called "business card" optical disk, the location of the hole has heretofore required that text and graphics material be sized and arranged to fit around the hole, limiting the size of the text and graphics and thus the attractiveness and distinctiveness of the text and graphics material.

Text and graphics labels are generally applied to the optical disk by silk screening onto one side of the disk, or by applying a paper or foil label to one side of the disk. The silk screening process avoids the hole in the center of the disk, and paper labels include a hole which is aligned with the hole in the disk. As used in this application, the term "label", except as otherwise defined or clear from context, refers to a means by which text and/or graphics material is applied to the disk, whether by silk screening, application of a sheet label, or otherwise.

The invention disclosed in this application permits text and/or graphics material to be applied to the center portion of an optical disk, including the area occupied by the hole in the center of the disk.

SUMMARY OF THE INVENTION

Therefore, it is an object of the invention to provide a label for an optical disk which permits text and/or graphics to be placed over the hole in the center of the optical disk.

It is another object of the invention to provide a label for an optical disk which permits text and/or graphics to be placed over the hole in the center of the optical disk without interfering with the utility of the hole.

It is another object of the invention to provide a means of permitting text and/or graphics to be placed over the hole in the center of an optical disk having a silk-screened label thereon.

It is another object of the invention to provide a means of permitting text and/or graphics to be placed over the hole in the center of an optical disk having a sheet label thereon.

It is another object of the invention to provide a means of permitting text and/or graphics to be placed over a hole in the center of an optical disk.

These and other objects of the present invention are achieved in the preferred embodiments disclosed below by providing an optical disk of the type rotated by a spindle positioned in a centrally-located hole, and comprising a disk body including an annular data area, and a centrally-located, integrally-formed annular web positioned radially inward from the annular data area and covering a hole formed in the disk body. The annular web is formed sufficiently thin to be deflected upwardly out of the plane of the disk body by the spindle during placement on the spindle and during rotation.

According to one preferred embodiment of the invention, the annular web is adapted to be deflected upwardly and broken free of the disk body to define the centrally-located hole by which the disk is rotated by the spindle positioned therein.

According to another preferred embodiment of the invention, the annular web is adapted to be deflected upwardly while remaining integral with the disk body to permit the spindle to fit into the hole to a degree sufficient to rotate the disk.

According to yet another preferred embodiment of the invention, the disk, including the annular web, is covered by a label.

According to yet another preferred embodiment of the invention, the label comprises material selected from the group consisting of paper, foil and plastic.

According to yet another preferred embodiment of the invention, the label comprises a printed layer applied to one side of the label.

According to yet another preferred embodiment of the invention, the label comprises ink that is silk-screened onto the one side of the label.

According to yet another preferred embodiment of the invention, an optical disk of the type having a hole therethrough for being positioned onto a rotatable spindle by which the optical disk is rotated is provided. This optical disk includes the combination therewith of a label formed of a sheet having a size and shape for being positioned on and adhered to the optical disk and overlying the hole, the sheet having sufficient thinness and flexibility to be deflected upwardly from the hole to permit the spindle to fit into the hole to a degree sufficient to rotate the disk.

According to yet another preferred embodiment of the invention, the label is adapted to be deflected upwardly out of the plane of the disk, the area of the label overlying the hole being detachable from a surrounding area of the label upon deflection.

According to yet another preferred embodiment of the invention, the label comprises an annular adhesive patch for being adhered to the optical disk over the hole.

According to yet another preferred embodiment of the invention, the patch includes a plurality of intersecting and radially-extending slits overlying the hole for being deflected upwardly by the spindle when the disk is placed on the spindle.

According to yet another preferred embodiment of the invention, the patch comprises a material that is resilient and capable of being deflected upwardly by the spindle.

An embodiment of the method of producing an optical disk for being positioned onto a rotatable spindle by which the optical disk is rotated according to the invention comprises the steps of forming a disk having a hole therein by which the disk is placed on and rotated by the rotatable spindle, forming a label to be applied to the disk, the label comprising a sheet having a size and shape for being positioned on and adhered to the optical disk and overlying the hole, and applying the label to the disk to the disk in registration with the hole.

According to yet another preferred embodiment of the invention, the method includes the step of forming the label from material selected from the group consisting of paper, foil and plastic.

According to yet another preferred embodiment of the invention, the method includes the step of forming the label in an annular shape that overlies the hole and a marginal area surrounding the hole.

According to yet another preferred embodiment of the invention, the method includes the step of printing graphic material onto the disk and the label overlying the hole.

According to yet another preferred embodiment of the invention, the method includes the step of forming a plurality of intersecting, radially-extending slits in the label for being deflected upwardly by the spindle.

According to yet another preferred embodiment of the invention, the method of forming the label includes the step of forming the label with a size to overlie the hole and a radially outwardly-extending area outboard of the hole, further wherein the full extent of the label is inboard of an optical data area on the disk.

Another embodiment of the method of producing an optical disk for being positioned onto a rotatable spindle by which the optical disk is rotated according to the invention comprises the steps forming a disk having a hole therein by which the disk is placed on and rotated by the rotatable spindle, forming a web integral with the disk overlying the hole and flush with one major surface of the disk, and printing a label onto the one major surface of the disk that overlies the hole.

According to yet another preferred embodiment of the invention, the step of forming the web comprises the step of forming the web sufficiently thin that it can be broken out when desired for placement of the disk on the spindle.

According to yet another preferred embodiment of the invention, the method includes step of forming the web sufficiently thin that it is deflectable upwardly from an original position by the spindle and returns to the original position when removed from the spindle.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
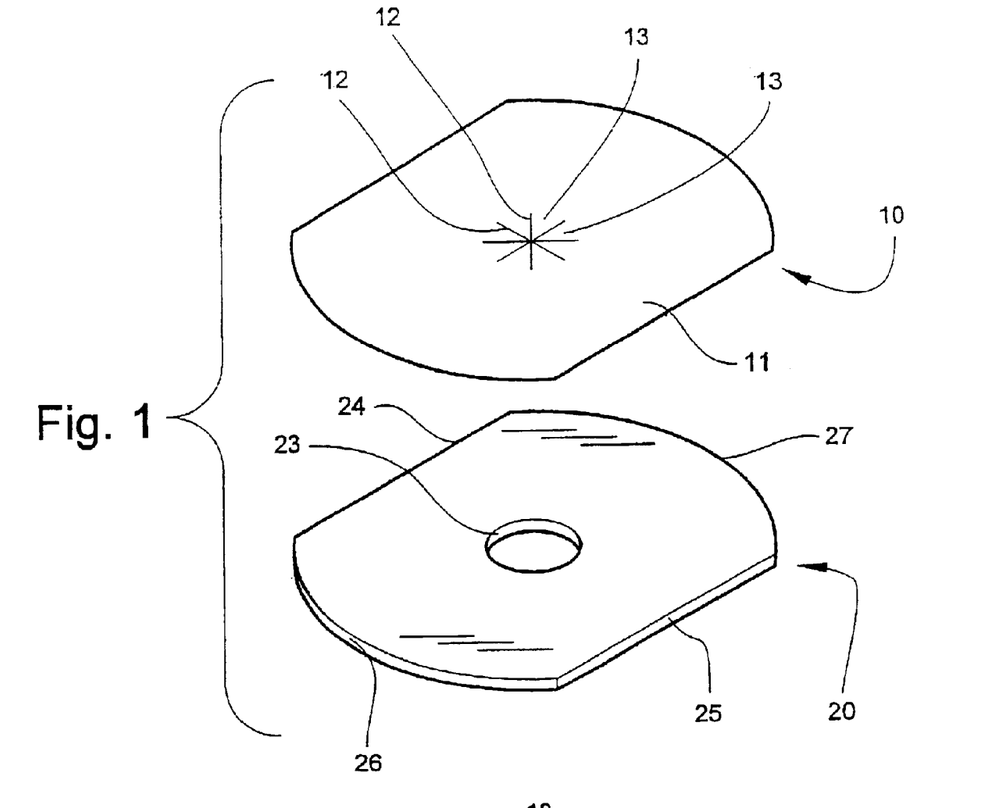
FIG. 1 is an exploded view of a label and optical disk according to one embodiment of the invention.
Figure 2:
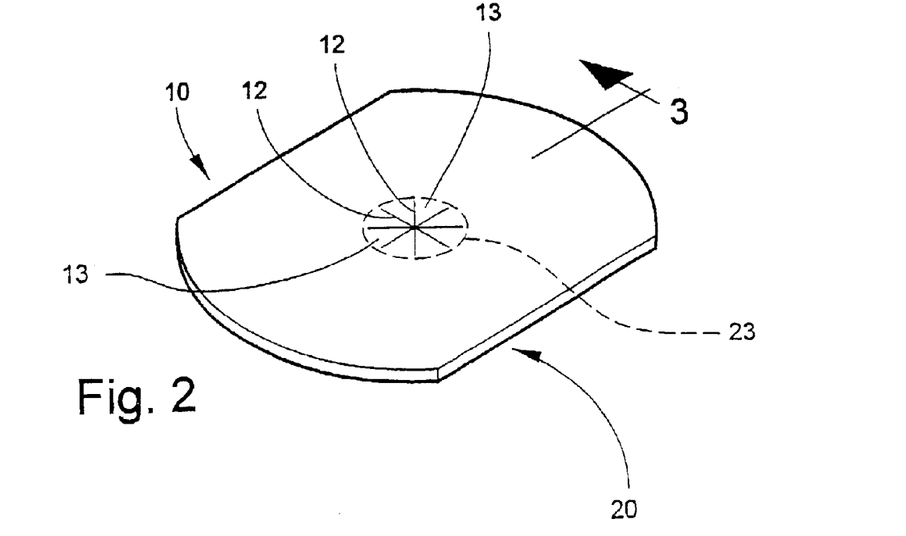
FIG. 2 is a view of the label and optical disk of FIG. 1, as assembled.

Referring now specifically to the drawings, a label according to the present invention is illustrated in FIG. 1 and shown generally at reference numeral 10. Label 10 is any suitable sheet material 11, such as paper or card stock, metal or plastic foil, or other plastic sheet material. Label 10 can be shaped to fit onto any optical disk of any size or shape. A plurality of slits 12 are formed in the sheet 11 and converge and intersect to form a star-shaped area defined by adjacent sheet segments 13. The slits 12 are placed in the label 10 in registration with the hole 23 so that when the label 10 is applied to the optical disk 20, the sheet segments 13 overlie the hole 23. The slits may be cut by any suitable method. As is shown in FIG. 2, the label 10 completely covers the hole 23 and renders it invisible. The slits 12 are only faintly visible, and lie in the plane of the sheet 11. This permits text and or graphics material to be placed on the label 10 without regard to the existence of the hole 23 in the optical disk 20. See FIGS. 6, 7 and 8.

Figure 3:
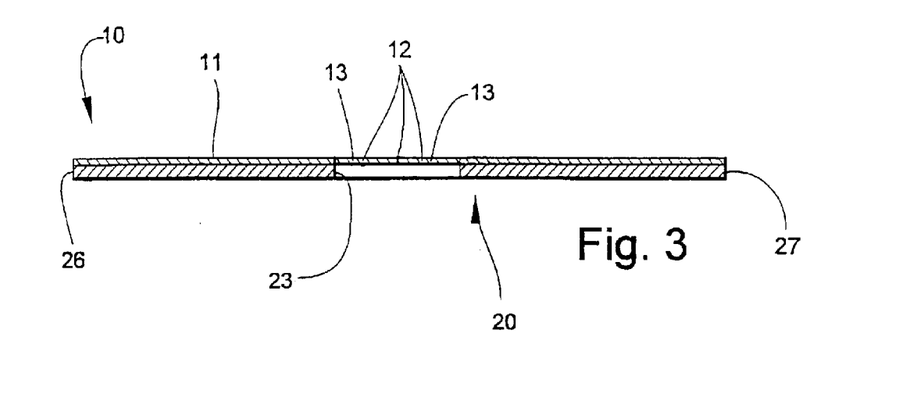
FIG. 3 is a vertical cross-section taken substantially along section line 3 of FIG. 2.
Figure 4:
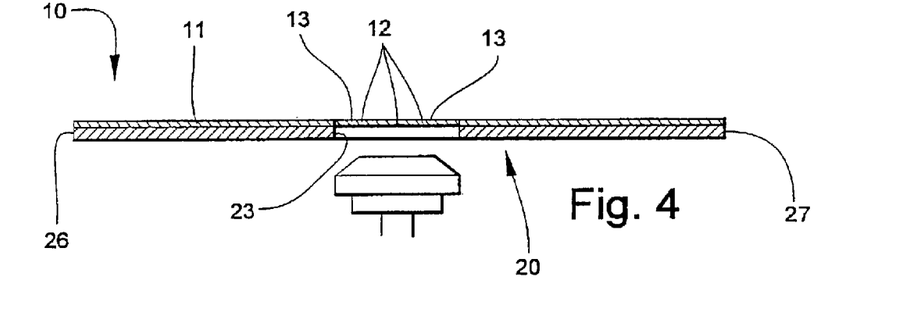
FIG. 4 is a cross-section as in FIG. 3, showing the orientation of a spindle to the hole and overlying label.
Figure 5:
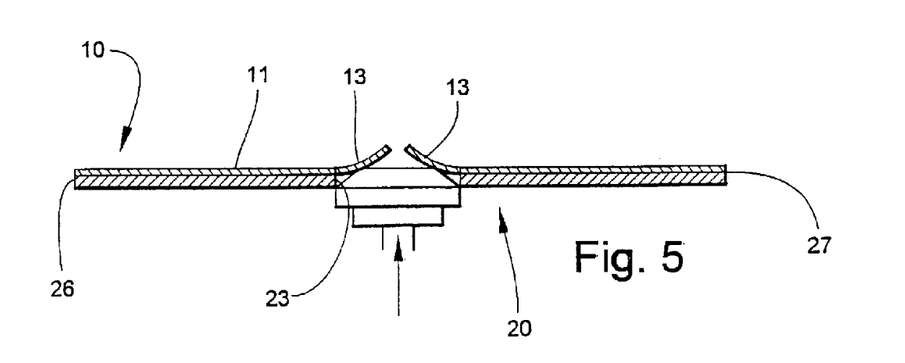
FIG. 5 is a cross-section as in FIG. 3, showing the spindle in the hole.

As is shown in FIGS. 3, 4 and 5, the sheet segments 13 are deformed upwardly as a spindle is extended through the hole 23. When the spindle is removed, the sheet segments 13 return to the plane of the sheet 11. If necessary, the sheet segments 13 can be pressed downwardly to resume a position in the plane of the sheet 11.

Figure 6:
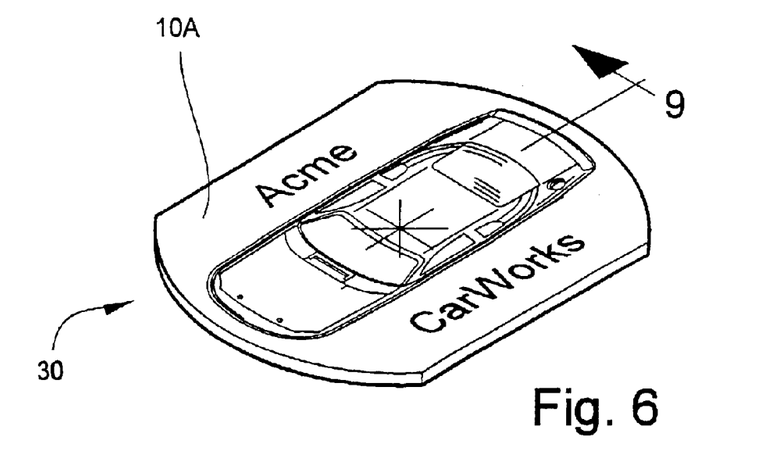
FIG. 6 is a perspective view of an optical disk having an integrally-formed web overlying the hole.
Figure 7:
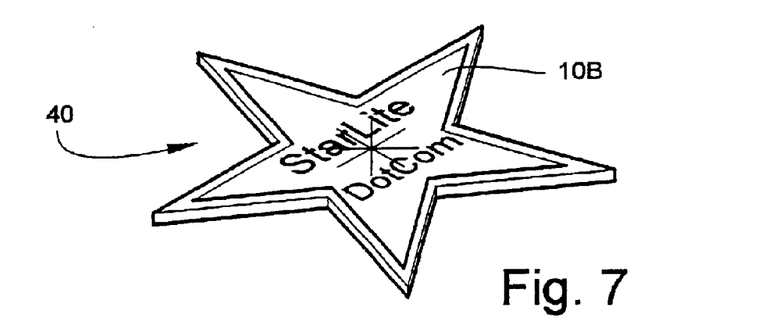
FIGS. 7 and 8 are perspective views of optical disks having sheet labels applied thereto.
Figure 8:
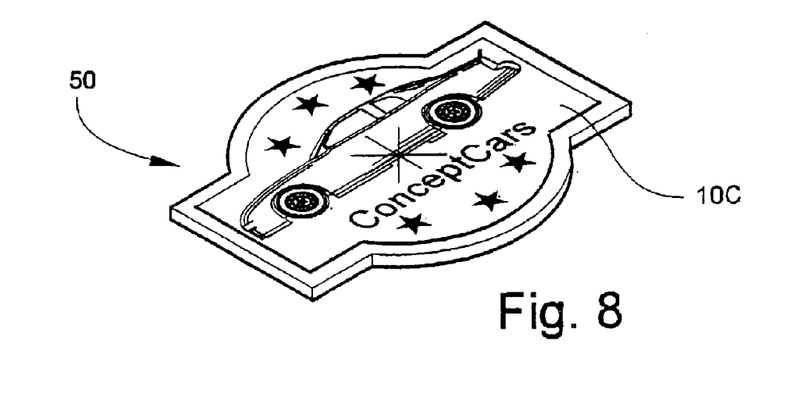

As is shown in FIGS. 6, 7 and 8, optical disks 30, 40 and 50 illustrate that text and/or graphics material can be placed on the labels 10A, 10B, 10C to occupy the area over the hole.

Figure 9:
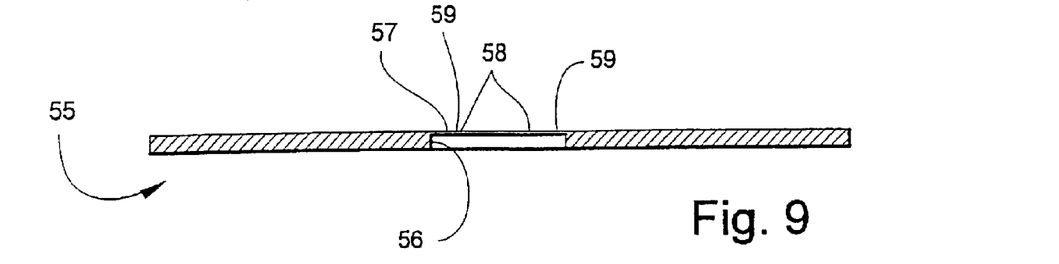
FIG. 9 is a cross-section of an optical disk wherein the hole is covered by an integrally-molded web.

Referring now to FIG. 9, an optical disk 55 is shown in cross-section, and includes a hole 56 covered by an integrally-molded, very thin web 57 which serves as a substrate which can be silk-screened or otherwise provided with text or graphics material, or merely painted with a desired color. The web 57 is provided with slits 58 arranged in a pattern such as shown above. The slits 58 permit the adjacent segments 59 to be deflected upwardly by an object such as a spindle inserted through the hole 56, as described above. The thickness and thus the flexibility is determined empirically based upon the plastic material from which the optical disk is molded.

Figure 10:
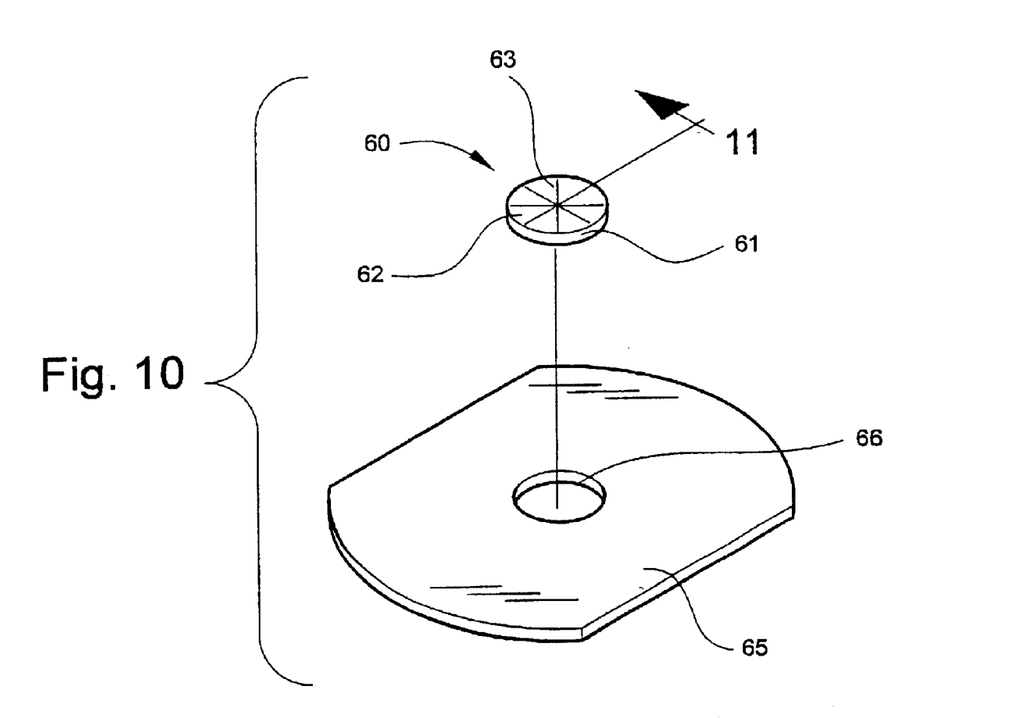
FIG. 10 is an exploded perspective view showing an insert for being inserted into a hole in the center of an optical disk.
Figure 11:
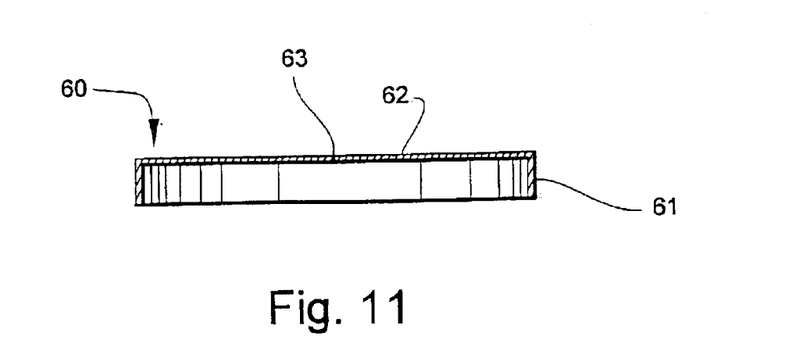
FIG. 11 is a cross-section taken along section line 11 of FIG. 10.

Referring now to FIGS. 10 and 11, an insert 60 is provided for being placed on an optical disk 65 in the hole 66. Insert 60 is formed of a thin annular ring 61 onto which is applied a sheet 62 having slits 63 which function as described above. It may be necessary to enlarge the hole 66 to the extent necessary to accommodate the thickness of the ring 61. Preferably, the insert 60 is applied to the optical disk 65 by means of a press fit. The insert is particularly desirable when the label of the optical disk 65 is to be applied by means of silk-screening rather than by a sheet label, such as a label 10, 10A, 10B or 10C.

Figure 12:
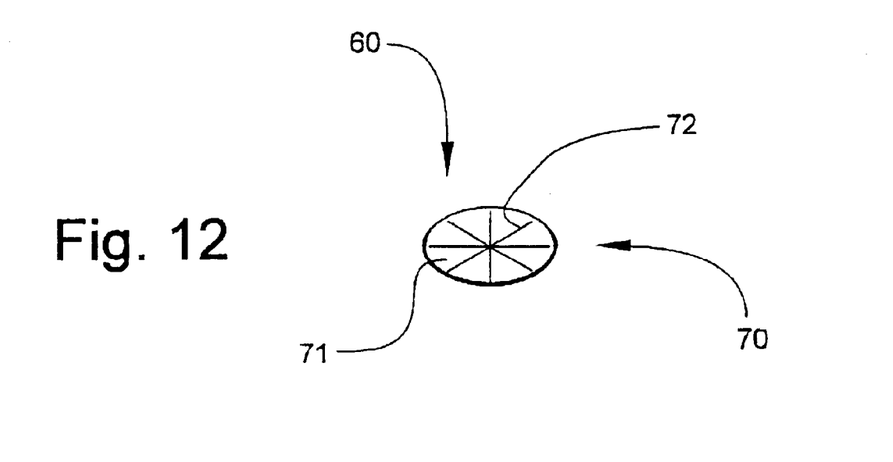
FIG. 12 is a perspective view of a label intended for placement over the hole in an optical disk.
Figure 13:
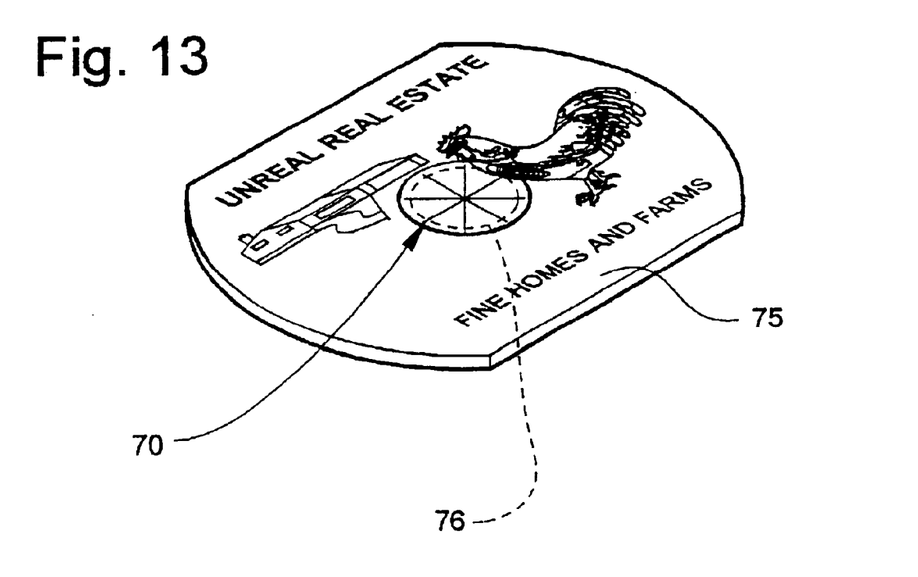
FIG. 13 is a perspective view of the label in FIG. 12 in place on an optical disk.

Referring now to FIGS. 12 and 13, a small label 70 is shown which is sized to fit over the hole in the optical disk and a small surrounding area. The label 70 is formed of a sheet material 71 which is provided with slits 72, as described above. The label 70 is applied over any optical disk 75 with a hole 76 in the center, which may then be, for example, silk-screened. The silk-screened design would therefore print onto the label 70 along with the rest of the surface of the disk 75. Alternatively, the label 70 may be applied to a previously silk-screened optical disk, in which case the label 70 must be oriented to match the previously applied text or graphics if required by the pattern.

Figure 14:
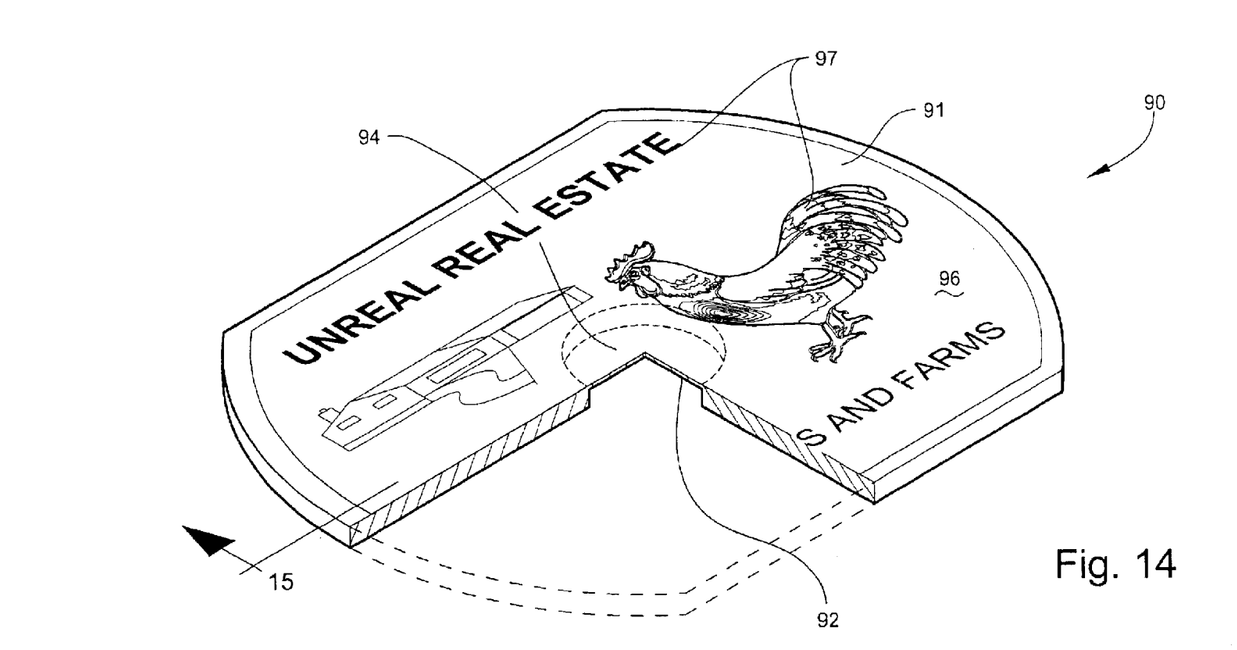
FIG. 14 is a fragmentary perspective view of an optical disk with the hole covered by an integrally-molded web without slits.
Figure 15:
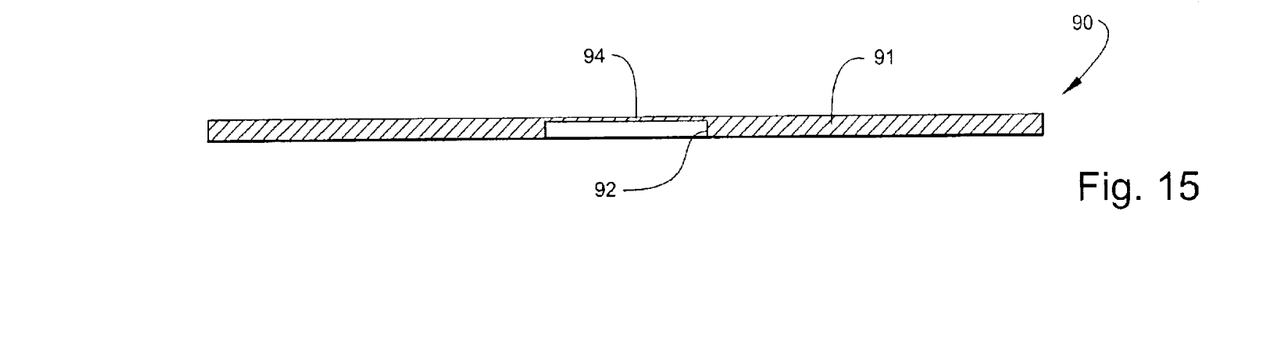
FIG. 15 is a vertical cross-section of an optical disk according to FIG. 14.
Figure 16:
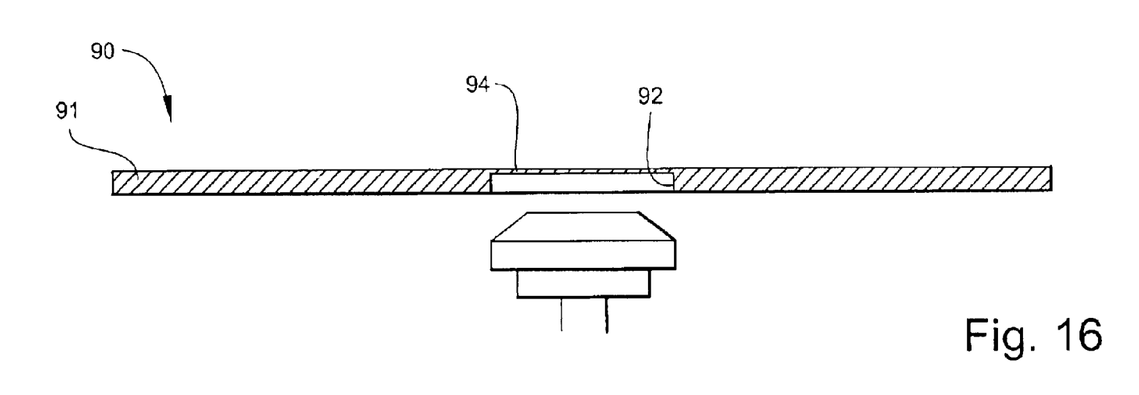
FIGS. 16 and 17 are vertical cross-sections of the optical disk according to FIGS. 14 and 15, showing ejection of the web covering the hole.
Figure 17:
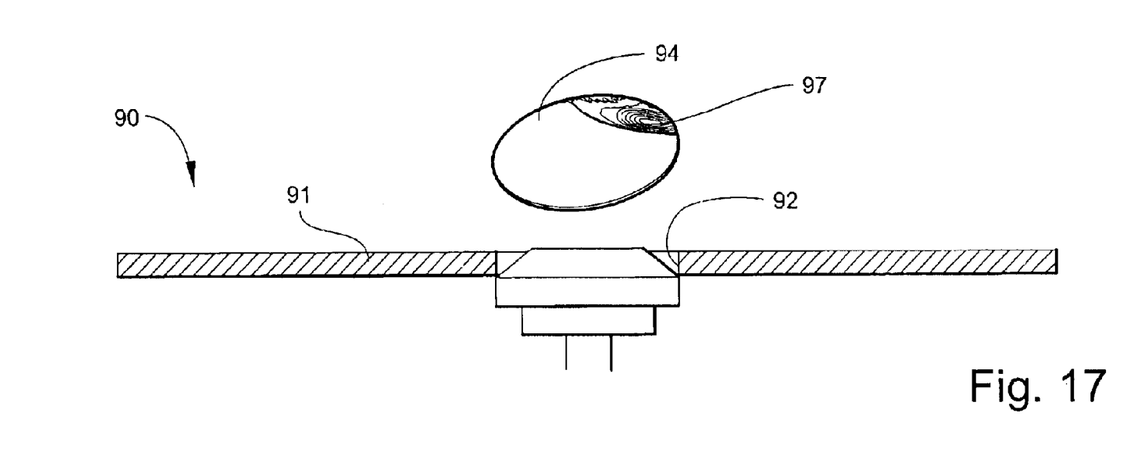

FIGS. 14 and 15 illustrate a further embodiment 90 wherein a disk body 91 has a hole 92 covered by an integrally-molded, very thin web 94 that serves as a substrate which can be silk-screened or otherwise provided with a label 96 with text and/or graphics material 97, or merely painted with a desired color. As distinct from the disk 55 shown in FIG. 9, the web 94 is solid. According to one embodiment of the invention the web 94 is sufficiently thin that it can easily be broken away from the surrounding annular edge of the disk body 91 by which it is integrally-formed with the disk body. See FIGS. 16 and 17. This is suitable in a situation where, for example, the disk distributor or advertiser is principally interested in the initial appearance of the disk 90 before purchase, and is not concerned with whether some of the label 96 is later removed by breaking out the web 94 and discarding it when the disk 90 is first used. An even thinner annular weakness line (not shown) may be formed at the point of juncture between the web 94 and the disk body 91 to further facilitate separation of the web 94 from the disk body 91 and to provide a clean, smooth break line. While the thickness of the web 94 will vary based on materials used, in general the web 94 should be about 1/10th the thickness of the disk 90.

Figure 18:
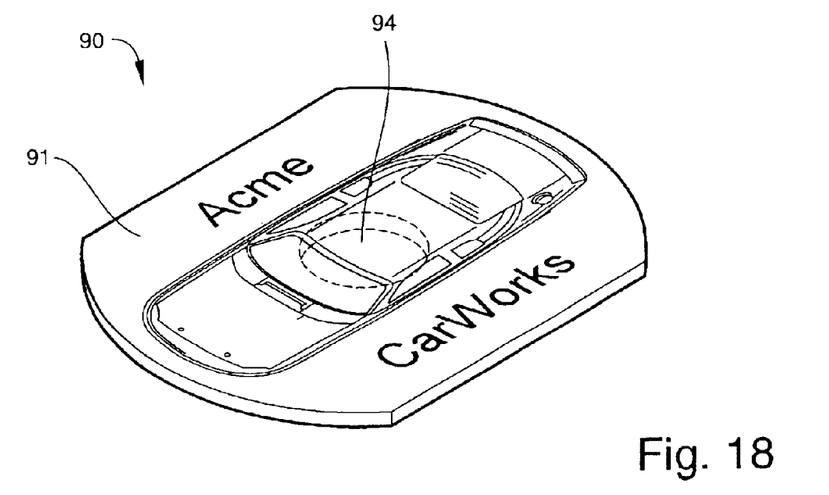
FIGS. 18, 19 and 20 are examples of shaped optical disks according to FIG. 14.
Figure 19:
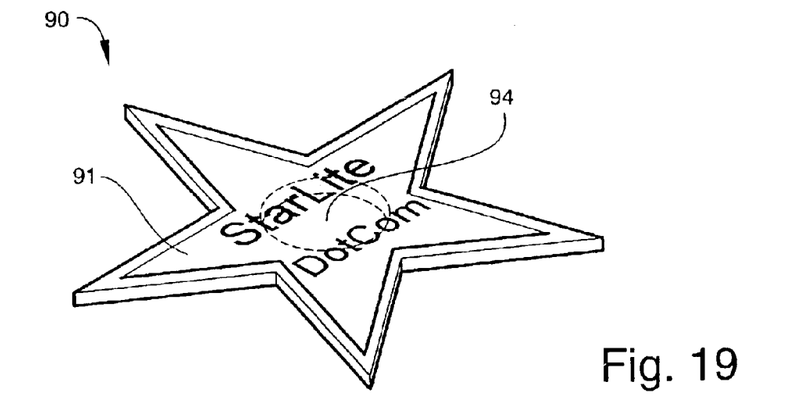
Figure 20:
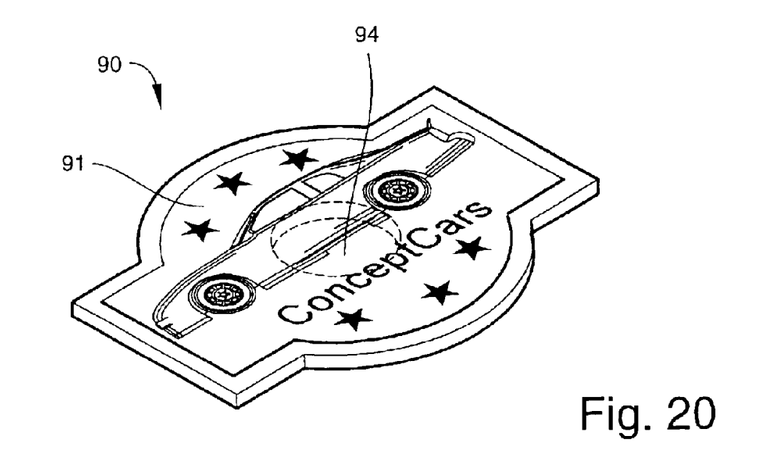

Examples of the disk 90 in different shapes are shown in FIGS. 18, 19 and 20, with the integral web 94 removable by breaking it away from the surrounding disk body 91.

Figure 21:
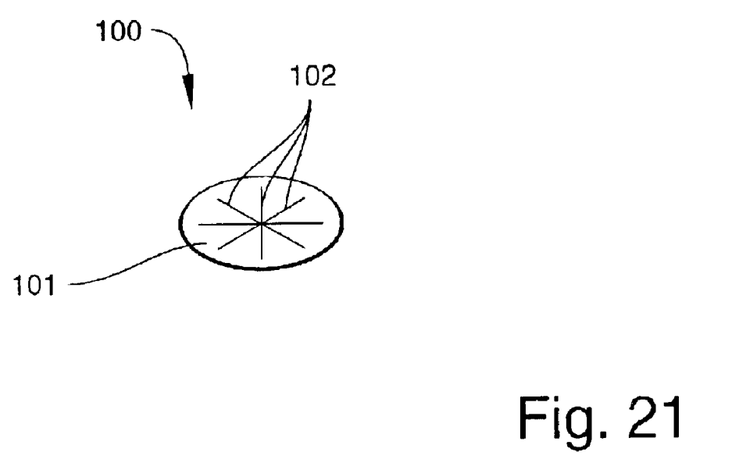
FIG. 21 is an adhesive label for the hole of an optical disk.
Figure 22:
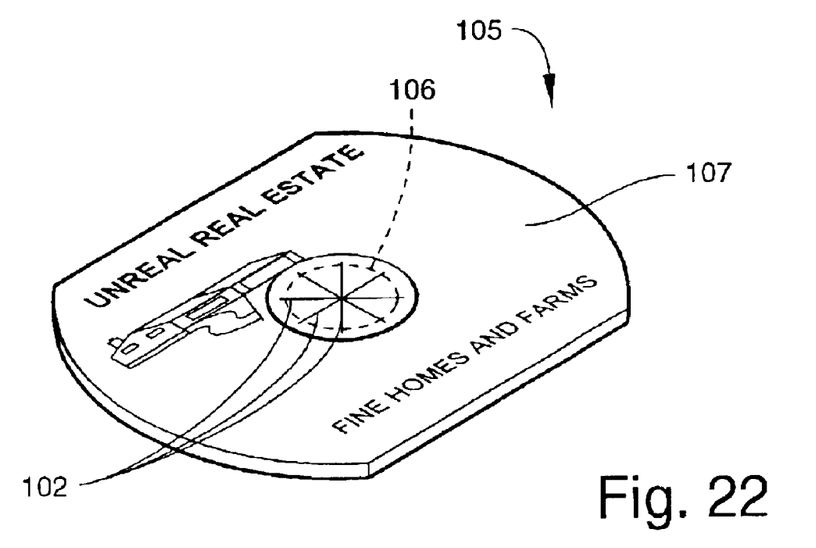
FIG. 22 is an optical disk where the hole is covered by a label as shown in FIG. 21.

As is shown in FIG. 21, a label 100 is comprised of a thin patch 101 of film material with an adhesive on a back side and suitable for being printed on the front side. The patch 101 is provided with several intersecting, radially-extending slits 102. As is shown in FIG. 22, the label 100 is positioned on a disk 105 over a hole 106 formed in a disk body 107. The label 100 sized to be approximately 5-20 percent larger in diameter than the hole 106 to be covered, so that the peripheral area of the label 100 overlies the hole and is adhered to the disk body in the marginal area adjacent the hole 106. The slits 102 function in the manner shown in FIGS. 4 and 5 to permit the spindle to deflect the segments of the patch 101 defined by the slits 102. If desired, the label 100 can be removed by raising a corner sufficiently to grasp it between two fingers, and then pulling it to detach it from the disk body 107.

Figure 23:
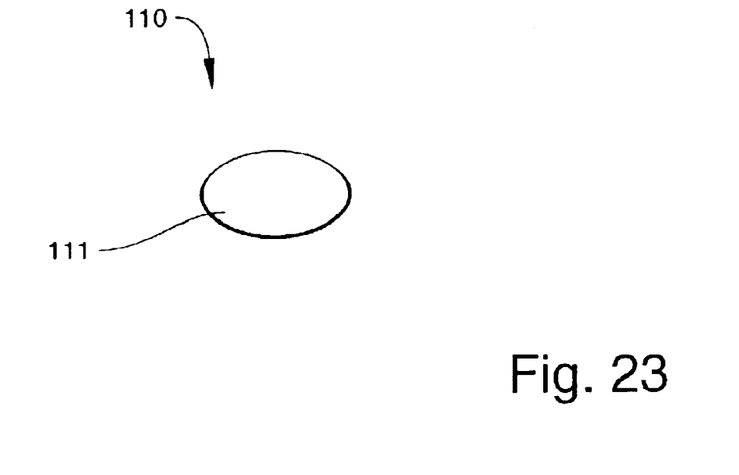
FIG. 23 is a label for this hole of an optical disk according to another embodiment of the invention.
Figure 24:
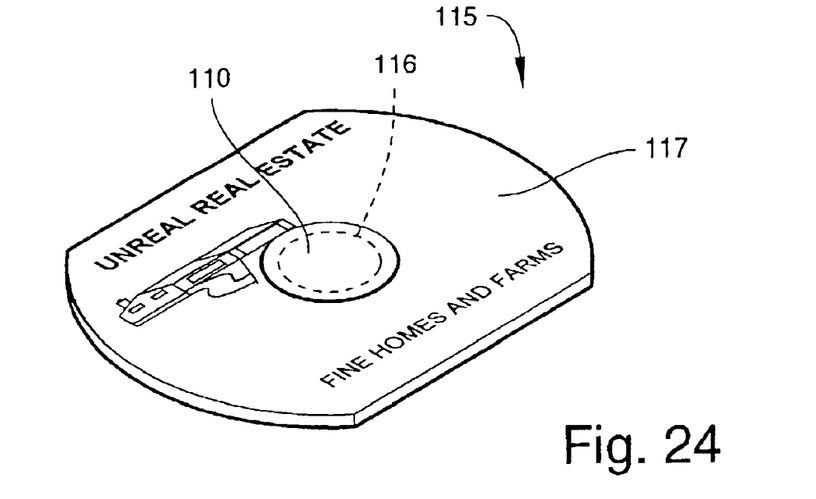
FIG. 24 is an optical disk where the hole is covered by a label as shown in FIG. 23.

As is shown in FIG. 23, a label 110 is comprised of a thin patch 111 of film material with an adhesive on a back side and suitable for being printed on the front side. As is shown in FIG. 24, the label 110 is positioned on a disk 115 over a hole 116 formed in a disk body 117. The label 110 sized to be approximately 5–20 percent larger in diameter than the hole 116 to be covered, so that the peripheral area of the label 110 overlies the hole 116 and is adhered to the disk body 117 in the marginal area adjacent the hole 106. The label 110 can be printed on by silk-screening or otherwise, so that desired text or graphical material can be applied over the entire top surface of the disk 115. If desired, the label 110 can be removed by raising a corner sufficiently to grasp it between two fingers, and then pulling it to detach it from the disk body 117. The label 110 can be made sufficiently thin and resilient that the spindle will deflect the label 110 upwardly without tearing or detaching it from the disk 117. In this way any text or graphics material printed or otherwise applied to the label 110 remains intact.

Figure 25:
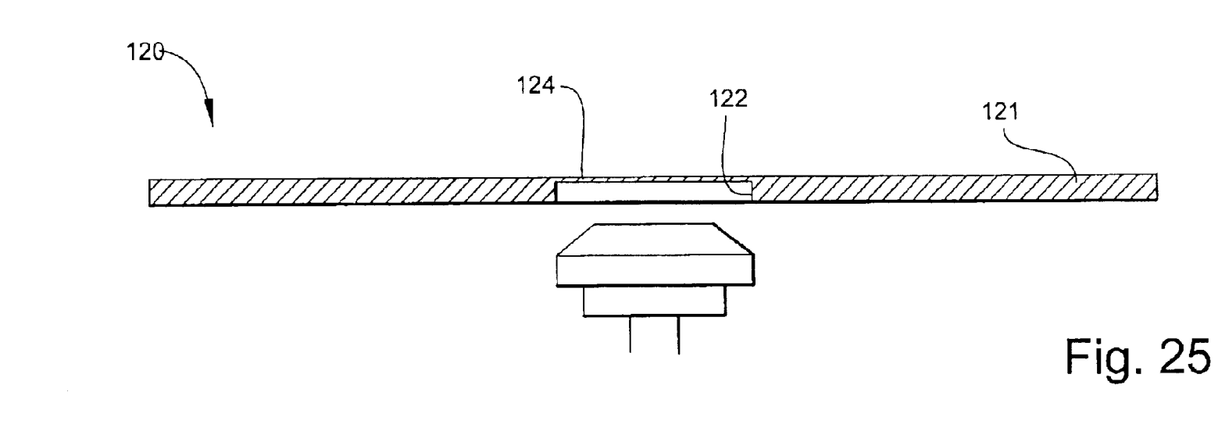
FIG. 25 is an optical disk having a deformable web that remains attached to the disk.
Figure 26:
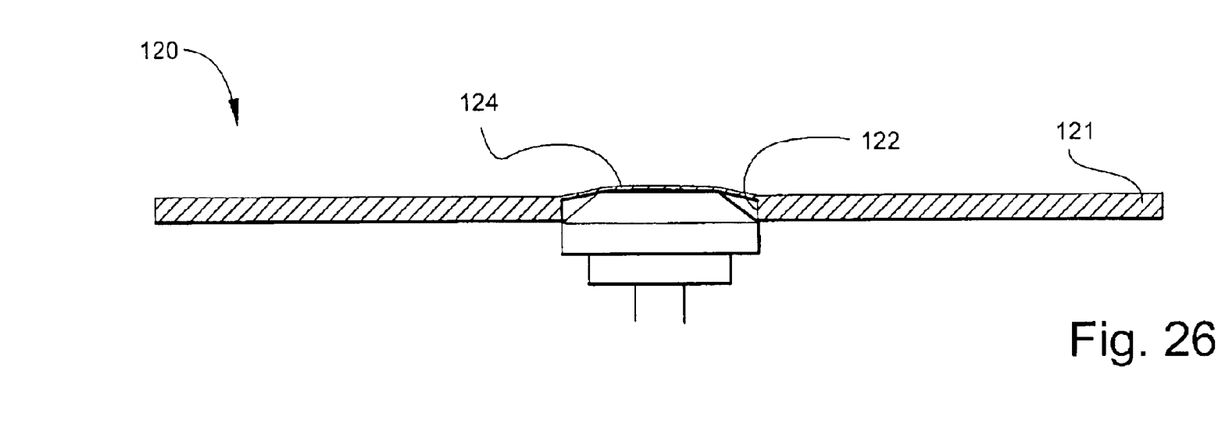
FIG. 26 illustrates the upward deformation of the web by the spindle.

Referring now to FIGS. 25 and 26, a further embodiment of an optical disk 120 is shown wherein a disk body 121 has a hole 122 covered by an integrally-molded, very thin web 124 that serves as a substrate which can be silk-screened or otherwise provided with a label. As distinct from the disk 55 shown in FIG. 9, the web 124 is solid. According to one embodiment of the invention the web 124 is sufficiently thin and deformable that it can be deflected upwardly from the surrounding annular edge of the disk body 121 by which it is integrally-formed without breaking to a degree sufficient to accommodate the spindle during rotation of the disk 120.

A label for an optical disk and method are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. An optical disk of the type rotated by a spindle positioned in a centrally-located hole, comprising:
    (a) a disk body including an annular data area; and
    (b) a centrally-located, integrally-molded annular web positioned radially inward from the annular data area and covering a recess molded in the disk body, the annular web formed sufficiently thin to be deflected upwardly out of the plane of the disk body by the spindle during placement on the spindle and during rotation.

2. An optical disk according to claim 1, wherein the annular web is adapted to be deflected upwardly and broken free of the disk body to define a centrally-located hole by which the disk is rotated by the spindle positioned therein.

3. An optical disk according to claim 1, wherein the annular web is adapted to be deflected upwardly while remaining integral with the disk body to permit the spindle to fit into the recess to a degree sufficient to rotate the disk.

4. An optical disk according to claim 1, wherein the disk, including the annular web, is covered by a label.

5. An optical disk according to claim 4, wherein the label comprises material selected from the group consisting of paper, foil and plastic.

6. An optical disk according to claim 4, wherein the label comprises a printed layer applied to one side of the label.

7. An optical disk according to claim 6, wherein the label comprises ink that is silk-screened onto the one side of the label.

8. A method of producing an optical disk for being positioned onto a rotatable spindle by which the optical disk is rotated, and comprising the steps of:

forming a disk having a recess therein by which the disk is placed on and rotated by the rotatable spindle;

simultaneously molding a web integral with the disk overlying the recess and flush with one major surface of the disk; and printing a label onto the one major surface of the disk that overlies the hole.

9. A method according to claim 8, wherein the step of molding the web comprises the step of forming the web sufficiently thin that it can be broken out when desired for placement of the disk on the spindle.

10. A method according to claim 8, and including the step of molding the web sufficiently thin that it is deflectable upwardly from an original position by the spindle and returns to the original position when removed from the spindle.

* * * * *